Patented Aug. 25, 1942

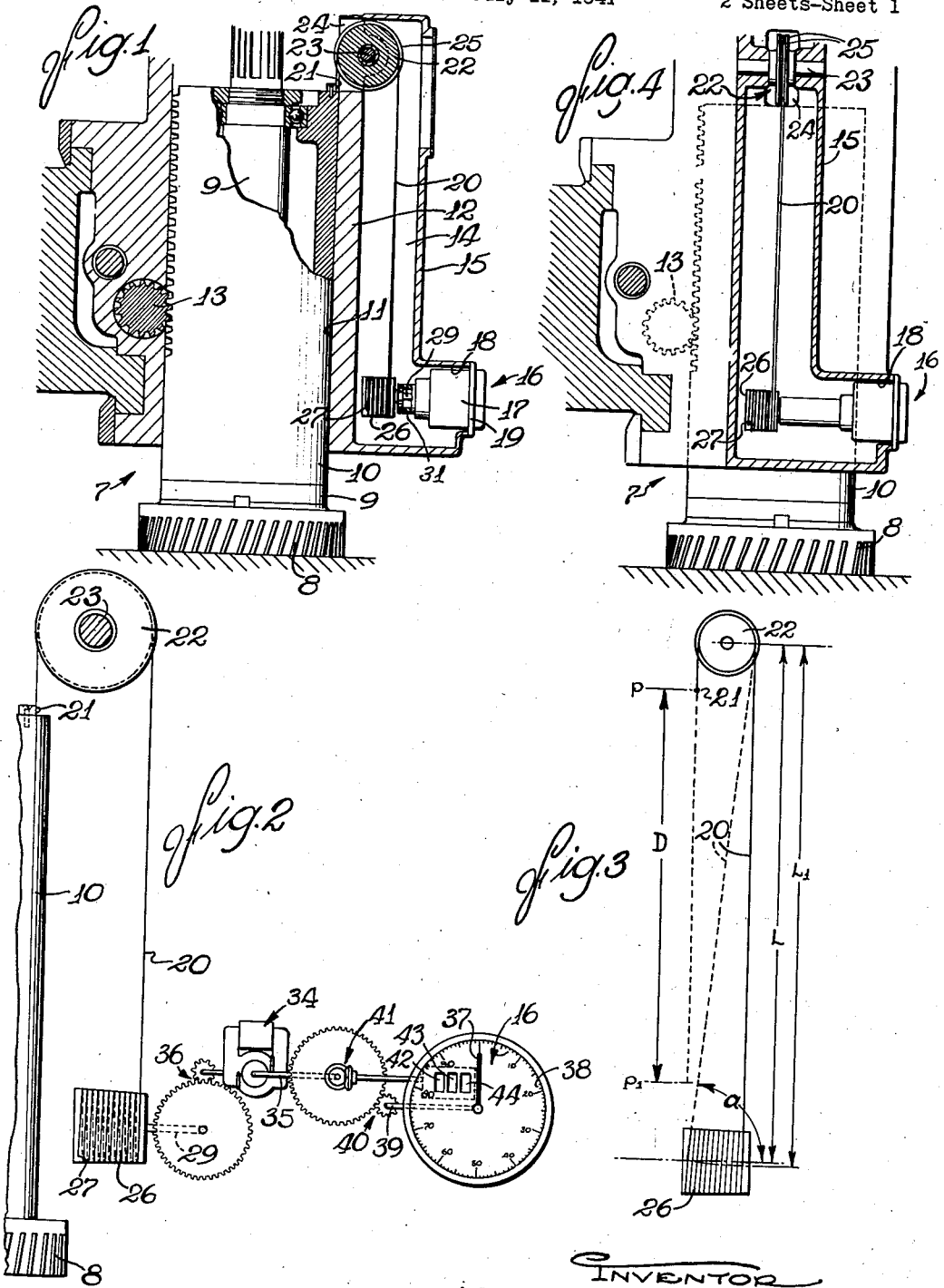

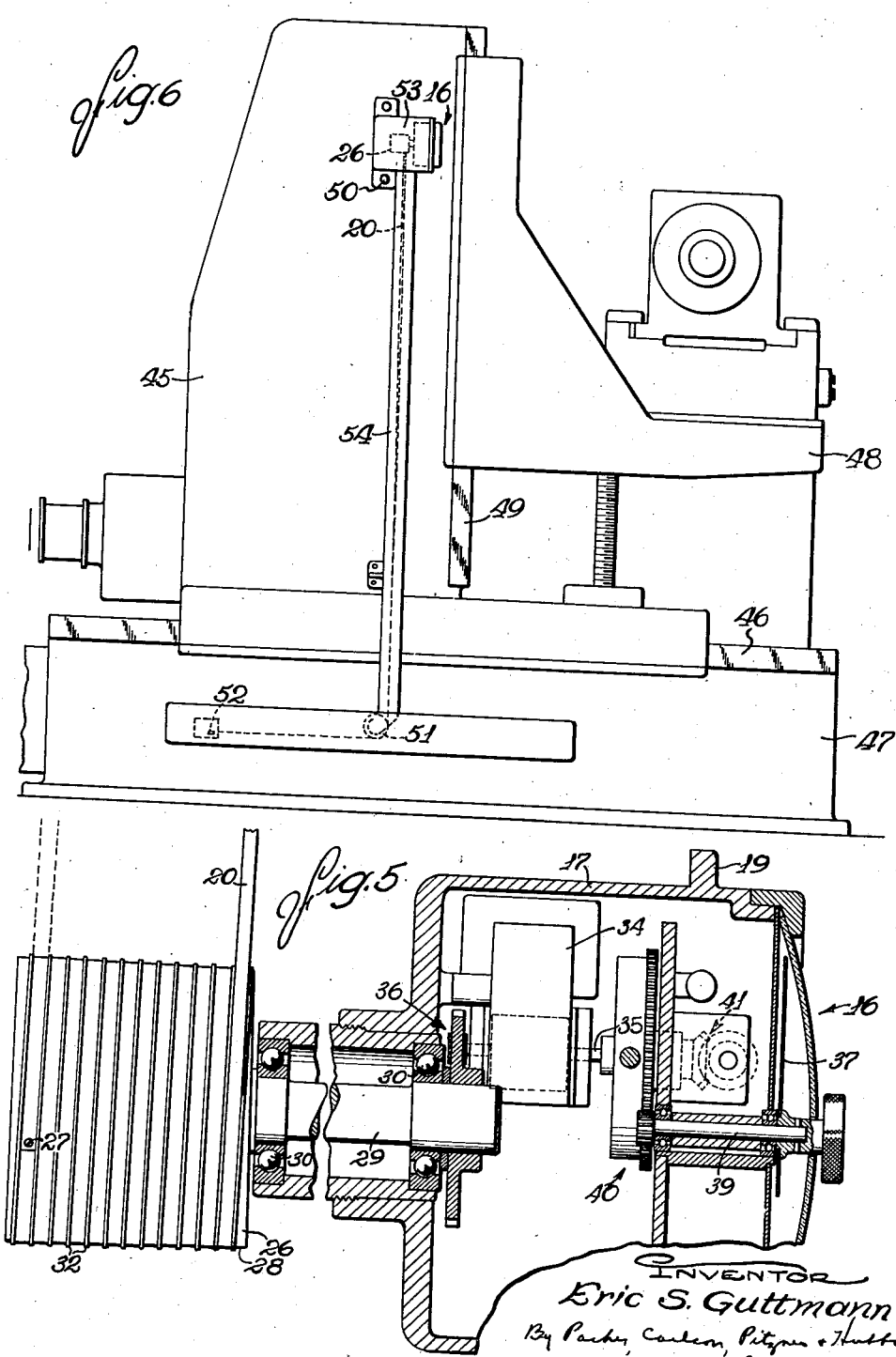

2,293,732

UNITED STATES PATENT OFFICE 2,293,732

MEASURING DEVICE

Eric S. Guttmann, Rockford, Ill., assignor to The Ingersoll Milling Machine Company, Rockford, Ill., a corporation of Illinois Application July 11, 1941, Serial No. 401,940

6 Claims. (Cl. 33—125)

This invention relates generally to a device for making fine measurements over comparatively long ranges and has more particular reference to a measuring device involving a flexible line helically wrapped around a drum which is rotated as the line is reeled and unreeled during displacement of the part whose motion is to be measured.

In adapting such devices to certain machine environments, it is desirable to maintain a fixed spacing between the points at which opposite ends of the straight unreeled portion of the line are supported. Under these conditions, the cross-travel of this straight portion tends to introduce an error in measurement. The primary object of the present invention is to eliminate this error.

The invention also resides in the novel character of the means employed in carrying out the foregoing object.

Other objects and advantages of the invention will become apparent from the following detailed description taken in connection with the accompanying drawings, in which Figure 1 is a fragmentary cross sectional view of a milling machine head equipped with a measuring device embodying the present invention.

Fig. 2 is a diagrammatic view of the operating parts of the measuring device.

Fig. 3 is a diagrammatic view illustrating different positions of the parts.

Fig. 4 is a view similar to Fig. 1 showing a modified arrangement.

Fig. 5 is a vertical sectional view taken through the drum and supporting casing of the measuring device.

Fig. 6 is an elevational view of a machine tool illustrating another adaptation of the invention.

The measuring device constituting the present invention is susceptible of various modifications and is adaptable to widely varying environments. Several adaptations in the machine tool field are shown herein. It will, of course, be understood that I do not intend to limit the invention by these exemplary disclosures but aim to cover all modifications, constructions and uses falling within the spirit and scope of the invention as expressed in the appended claims.

In Figs. 1, 2 and 3, the improved measuring device is incorporated in the tool head 7 of a milling machine and arranged to indicate the axial displacement of a face milling cutter 8. The latter is fast on a power rotated spindle 9 journalled in a quill 10 which is splined against rotation and accurately guided for axial movement in an internal cylindrical way 11 formed in the tool head housing 12. The quill may be set axially by hand or by power by rotating a pinion 13 meshing with rack teeth on the side of the quill.

In the present instance, the parts of the improved measuring device are arranged within a compartment 14 disposed in front of the quill guide and defined in part by the front wall 15 of the tool head. The device includes a rotary indicator 16 visible from the exposed end of a casing 17 projecting through an opening 18 in the wall 15 and clamped to this wall by screws entered through a flange 19.

The relative motion between the quill 10 and the head housing 12 is transmitted to the indicator 16 through a flexible line 20 having one end connected at 21 to the upper end of the quill and led around a guide which, in the present instance, comprises a roller or pulley 22 rotatably supported through trunnions 23 in an opening 24 in the housing above the uppermost position of the quill as shown in Fig. 1. Herein the line is led half way around the periphery of the roller between flanges 25 and thence extends downwardly generally parallel to the quill to a drum 26 around the peripheral surface 28 of which the other end portion of the line is wrapped helically with its extreme end anchored at 27 to the drum for rotation therewith.

The line 20 is of homogeneous material such as spring steel and preferably comprises a very thin tape or ribbon which, when placed under light tension, will conform exactly to the peripheral contour of the drum and the unreeled portion of the tape between the guide roller 22 and the point of lead-off of the tape from the drum will be maintained taut without the application of excessive tension.

The drum is mounted in axially fixed position and comprises a generally cylindrical sleeve made fast on and accurately concentric with a shaft 29 which projects axially from the drum and in this instance is supported from opposite ends by antifriction bearings 30, one supported in the indicator casing 17 and the other adjacent the drum at the remote end of a sleeve 31 projecting axially from the casing 17. A rib 32 fastened to and extending helically around the drum defines a groove which prevents objectionable lateral displacement of the tape on the drum as an incident to sudden acceleration or retardation. The groove is somewhat wider than the tape so as to provide a normal clearance at the side edges of the tape.

The drum shaft 29 is rotatably biased in a direction to wind up the tape, in this instance by a motor 34 acting on a shaft 35 connected to the drum shaft by speed reduction gearing 36. The rotary elements of the indicator are divided into two parts, one for indicating primary units, such as inches and tenths of such units comprising a plural wheel counter, and the other for indicating secondary units, such as thousandths and hundredths and being a dial type counter.

The dial counter comprises a pointer 37 coacting with a scale 38 uniformly graduated in thousandths of an inch where the measurement is linear. The pointer is on a shaft 39 driven from the shaft 35 through a friction disk clutch (not shown) and gearing 40. The driven element of the clutch operates through bevel gearing 41 to drive the three counter wheels 42, 43 and 44 for indicating ten inches, one inch, and one-tenth of an inch respectively.

By guiding the unreeled tape around one or more rollers as above described, the indicator 16 may be located adjacent the cutter or in any other position that may be required in order to facilitate convenient reading or to connect the tape to a comparatively inaccessible part. This arrangement, however, necessitates a fixed spacing of the drum and the guide roller 22 because of which spacing, together with the helical winding of the tape on the axially fixed drum, the angle between the drum axis and that portion of the tape spanning the space between the drum and the roller will change during winding and unwinding of the tape. Because of this changing angle, an error of substantial magnitude would be introduced if the drum were formed with a cylindrical surface and the gearing 36 and 40 correlated as contemplated with the effective diameter of such a surface. This can perhaps best be appreciated by reference to Fig. 3. With the free end 21 of the tape at the point P, a length L of tape will be unreeled. As the quill moves downwardly, the portion of the tape between the drum and the roller cross-travels to the left and occupies the position shown by the dotted line when the quill reaches position P₁. At this time, a longer length L₁ of tape will be disposed between the drum and the roller. Thus, in the case of a cylindrical drum, the circumferential displacement of a point on the effective circumference of the drum for each unit of movement of the quill will increase as the tape is unwound. As a result, the distance registered on the indicator 16 will exceed the actual displacement of the quill. For example, if the range of the instrument is six feet, an error on the order of .009 of an inch would be introduced. Of course, the greater the spacing of the drum and guide roller, the smaller will be the error introduced. The error may be minimized with a cylindrical drum by positioning the drum axially so that the tape is disposed at the helix angle of the wound tape to a perpendicular to the drum axis when half of the tape is unreeled, but even in this case the error is of such magnitude as to be objectionable in precision work.

The present invention contemplates correcting for this error by providing for the maintenance of a uniform angular displacement of the take-up reel or drum for each unit of travel of the object whose motion is to be measured. This relation may be obtained in various ways, for example, by changing the effective diameter of that portion of the guide roller 22 which is contacted by the tape or by bending the tape between the roller and the drum progressively with the movements of the quill while employing a cylindrical drum. For the sake of simplicity, however, it is preferred to use a non-cylindrical drum whose external surface is a surface of revolution about the drum axis but varies in diameter progressively and longitudinally by an amount such as to compensate exactly for the change in tape length due to the cross-travel.

The contour of the drum surface for producing this relationship may be expressed mathematically. Although it is a sine function and therefore is not straight, the amount of curvature is very small and for most applications closely approximates a straight line. Accordingly, the requisite accuracy of measurement may be obtained by employing a straight tapered or frustoconical drum surface as shown, thereby effecting a substantial reduction in manufacturing costs. The degree of taper may be ascertained in various ways and, in any case, is very small, a taper of .003 of an inch, for example, correcting for an accumulated error of .009 in an instrument having a six foot range.

Where, as in Fig. 1, the tape extends at right angles to the drum axis when the tape is fully wound up, the smallest drum diameter is at this point. The diameter increases progressively toward the other end of the drum from which the tape is led when the other limit position of the quill is reached, the angle $a$ between the tape and the drum axis being a minimum at this point.

With a drum shaped as above described, a proportionality, which is fixed for all practical purposes, obtains between angular rotation of the drum and endwise displacement of the free end of the line. To put it another way, the circumferential length of each convolution of the tape on the drum differs from that of each adjacent convolution by an amount equal to the difference in length of the line required to span the gap from it to the pulley 22 and that required to span the gap from such pulley to said adjacent convolutions. In this way, the drum contour compensates for the change in the length of the tape in cross-traveling and the drum turns through the same angle for each increment of movement of the quill.

It will be observed that in the arrangement shown in Fig. 1, the drum axis extends transversely of the axis of the guide roller. This, of course, necessitates twisting the unreeled portion of the tape as compared to the arrangement shown in Fig. 4 in which the drum and guide roller axes are parallel. The former arrangement is preferred because, as an incident to cross-traveling of the tape along the drum, the point of contact with the roller simply moves around the roller. There is no edgewise bending of the tape or lateral shifting that would result in rubbing contact between the tape and the roller flanges and the consequent introduction of an error in the indicator reading.

The versatility of the present invention in permitting the indicator to be located in any desired position and independently of the position or direction of movement of the movable actuating member is illustrated in Fig. 6. Here the movable member comprises a column 45 slidable along horizontal ways 46 on a bed 47 and supporting a work table 48 vertically slidable along ways 49 on the column. To facilitate reading of the indicator by the machine operator, it is desirable to locate the indicator 16 on the horizontally movable column. Accordingly, the casing 17 and the drum are supported by a bracket 50 and the unreeled portion of the tape is extended downwardly around a guide roller 51 and then horizontally to a point 52 of attachment on the stationary bed. The drum and tape are enclosed in housings 53 and 54 on the column and bed, and the latter provides a support for the roller 51. Thus, in this case, the unreeled portion of the tape extends at an angle to the direction of the motion being measured. It may, of course, be extended in any other direction as by the interposition of additional guide rollers around which the tape is led.

This application is a continuation in part of my application, Serial No. 298,923, filed October 11, 1939, now Patent 2,276,302, dated March 17, 1942.

I claim as my invention:

1. Apparatus for measuring the relative movement between two supports along a predetermined path having, in combination, a guide roller rotatably mounted on one of said supports, a drum rotatably mounted on the same support in fixed spaced relation to said roller with its axis extending transversely of the roller axis at right angles thereto, a flexible line having one end portion wound helically around said drum for rotation therewith and the other end portion extending around said roller and fastened at its free end to the other of said supports whereby the line is reeled in and unreeled from the drum during relative movement of said supports in opposite directions, the diameter of the drum periphery changing progressively and longitudinally to maintain a fixed relation between said relative movement and the angular movement of the drum and thereby compensate for variations in the length of line between said roller and drum as the line cross-travels in winding and unwinding, and means tending to rotate said drum in a direction to wind up said line.

2. Apparatus for measuring the relative movement between two supports along a predetermined path having, in combination, a guide roller rotatably mounted on one of said supports, a drum rotatably mounted on the same support in fixed spaced relation to said roller, and a flexible line wound helically around said drum for rotation therewith with one end portion unreeled from the drum led around said roller and fastened at its free end to the other of said supports, the circumference of the drum periphery changing progressively and longitudinally to compensate for variations in the length of line between said roller and drum as the line cross-travels in winding and unwinding.

3. Apparatus for measuring the relative movement between two supports along a predetermined path having, in combination, a guide on one of said supports, a drum rotatably mounted on the same support in fixed spaced relation to said guide, and a flexible line wound helically around said drum for rotation therewith with one end portion unreeled from the drum led around said guide and fastened at its free end to the other of said supports, the periphery of said drum being contoured to compensate for cross-traveling of the line and cause uniform angular displacement of said drum for each unit of said relative movement.

4. Apparatus for measuring the relative movement between two supports along a predetermined path having, in combination, two members rotatably supported on one of said supports to turn on spaced axes, each member having a peripheral surface of circular cross-section, and a flexible line wound helically around one of said surfaces with one end rotatable therewith and with the other end portion of the line extending around the other of said surfaces and fastened at its free end to the other of said supports whereby the line is reeled in and unreeled from the drum during relative movement of said supports in opposite directions, the diameter of said first mentioned surface changing progressively and longitudinally so that its angular displacement is uniform for each unit of travel of the movable support.

5. Apparatus for measuring the relative movement between two supports along a predetermined path having, in combination, a guide on one of said supports, a drum rotatably mounted on the same support in fixed spaced relation to said guide, a flexible line wound helically around said drum with one end portion led off from the drum around said roller and fastened at its free end to the other of said supports, and means operable during cross-traveling of the line in winding and unwinding to vary progressively the length of line paid out or reeled in per unit of travel of the movable support and thereby cause equal circumferential displacement of the drum for each of said units of travel.

6. Apparatus for measuring the relative movement between two supports along a predetermined path having, in combination, two members rotatably supported on one of said supports to turn on spaced axes, each member having a peripheral surface of circular cross-section, and a flexible line wound helically around one of said surfaces with one end rotatable therewith and with the other end portion of the line extending around the other of said surfaces and fastened at its free end to the other of said supports whereby the line is reeled in and unreeled from the drum during relative movement of said supports in opposite directions, said first mentioned surface having a longitudinally curved taper such as to maintain a constant ratio between the angular displacement of such member and the travel of the movable support.

ERIC S. GUTTMANN.